United States Patent
Hayashi et al.

(10) Patent No.: US 10,015,344 B2
(45) Date of Patent: Jul. 3, 2018

(54) IMAGE PROCESSING APPARATUS AND IMAGE FORMING APPARATUS

(71) Applicant: FUJI XEROX CO., LTD., Tokyo (JP)

(72) Inventors: Kazuo Hayashi, Kanagawa (JP); Kenichi Takahashi, Kanagawa (JP); Shunji Tsunashima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/441,761

(22) Filed: Feb. 24, 2017

(65) Prior Publication Data
US 2018/0048779 A1  Feb. 15, 2018

(30) Foreign Application Priority Data
Aug. 10, 2016  (JP) ................................. 2016-157388

(51) Int. Cl.
H04N 1/00  (2006.01)

(52) U.S. Cl.
CPC ..... H04N 1/00915 (2013.01); H04N 1/00952 (2013.01); *H04N 2201/0094* (2013.01)

(58) Field of Classification Search
USPC ....................................................... 358/1.15
See application file for complete search history.

(56) References Cited

U.S. PATENT DOCUMENTS 6,236,464 B1 * 5/2001 Kohtani ............. H04N 1/32502
358/1.15
2008/0291489 A1 * 11/2008 Takahashi ............. G06F 3/1222
358/1.15

FOREIGN PATENT DOCUMENTS

JP  2004-173206 A  6/2004

* cited by examiner

*Primary Examiner* — Ngon Nguyen
(74) *Attorney, Agent, or Firm* — Oliff PLC

(57) ABSTRACT

An image processing apparatus includes multiple image processing units and multiple execution controllers. The multiple image processing units respectively perform different types of image processing operations executable on image data. The multiple execution controllers each perform control to select and run grouped image processing units of the multiple image processing units. Each of the multiple execution controllers selects and runs the grouped image processing units in accordance with a corresponding one of rules that are specified for the respective execution controllers, and one of the multiple execution controllers is used in a series of image processing operations performed on the image data.

11 Claims, 5 Drawing Sheets

IMAGE PROCESSING APPARATUS AND IMAGE FORMING APPARATUS

CROSS-REFERENCE TO RELATED APPLICATIONS

This application is based on and claims priority under 35 USC 119 from Japanese Patent Application No. 2016-157388 filed Aug. 10, 2016.

BACKGROUND

(i) Technical Field

The present invention relates to an image processing apparatus and an image forming apparatus.

(ii) Related Art

In some cases, a process is executed in such a manner that one of function modules having respective different functions and connected to a common bus is selected for one of various purposes. In such cases, if processes are executed by a group of some of the function modules in a configuration in which one controller controls operations of all of the function modules, it is difficult to hide the content of the processes, and the content is thus easily exposed.

Summary

According to an aspect of the invention, there is provided an image processing apparatus including multiple image processing units and multiple execution controllers. The multiple image processing units respectively perform different types of image processing operations executable on image data. The multiple execution controllers each perform control to select and run grouped image processing units of the multiple image processing units. Each of the multiple execution controllers selects and runs the grouped image processing units in accordance with a corresponding one of rules that are specified for the respective execution controllers, and one of the multiple execution controllers is used in a series of image processing operations performed on the image data.

BRIEF DESCRIPTION OF THE DRAWINGS

An exemplary embodiment of the present invention will be described in detail based on the following figures, wherein.

DETAILED DESCRIPTION

Hardware Configuration of Image Processing Apparatus

Hereinafter, an exemplary embodiment of the present invention will be described in detail with reference to the attached drawings.

Figure 1:
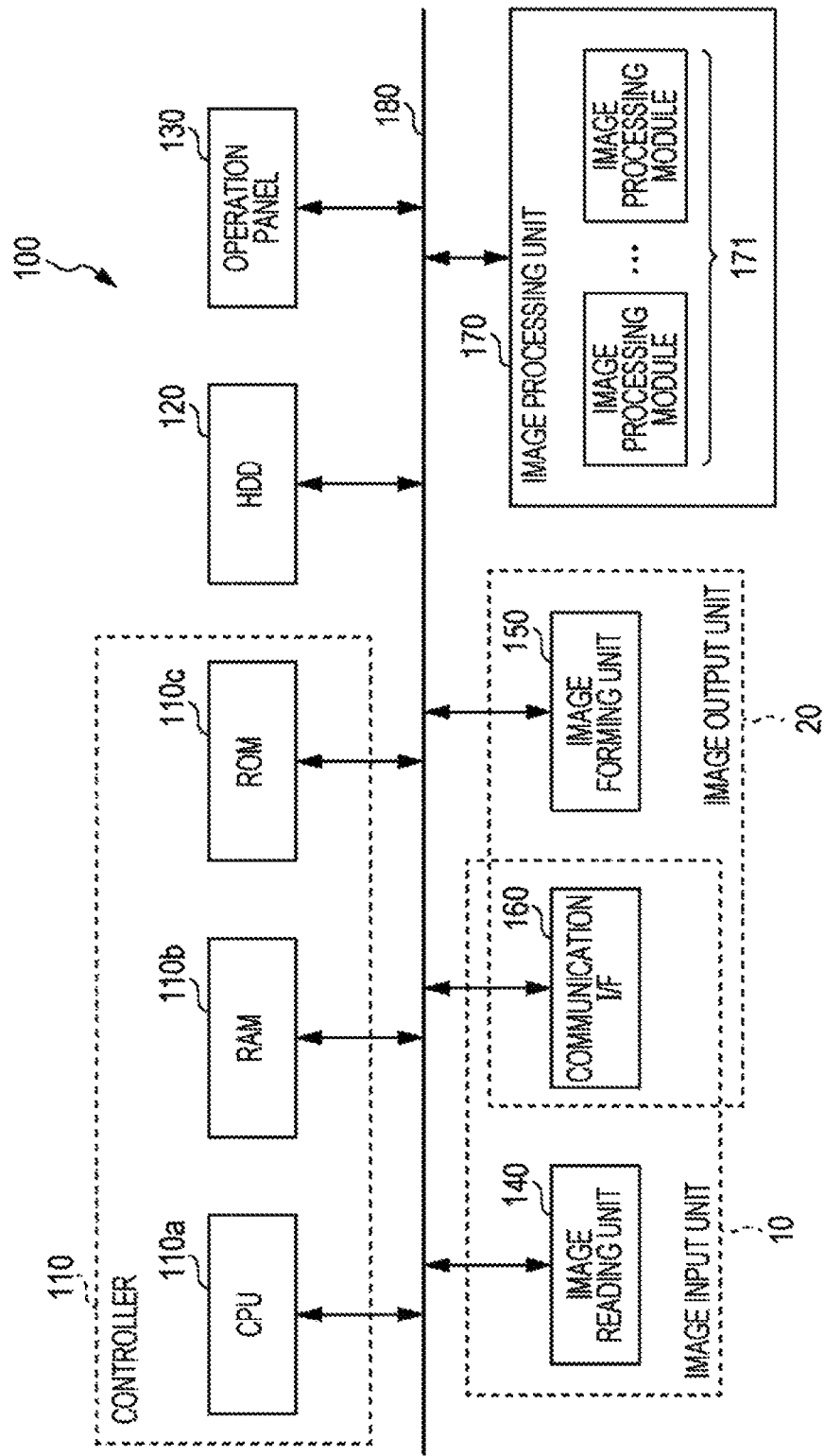
FIG. 1 is a diagram illustrating an example hardware configuration of an image processing apparatus according to the exemplary embodiment.

First, the hardware configuration of image processing apparatuses 100 according to the exemplary embodiment will be described. FIG. 1 is a diagram illustrating an example hardware configuration of each image processing apparatus 100 according to the exemplary embodiment. The image processing apparatus 100 according to the exemplary embodiment has various image processing functions such as a scanning function, a printing function, a copy function, and a facsimile function.

As illustrated in FIG. 1, the image processing apparatus 100 according to the exemplary embodiment includes a controller 110, a hard disk drive (HDD) 120, an operation panel 130, an image reading unit 140, an image forming unit 150, a communication interface (hereinafter, referred to as a communication I/F) 160, and an image processing unit 170. These function units are connected to a bus 180, and data is exchanged through the bus 180.

The controller 110 that is an example of a hiding unit controls operations of the component units of the image processing apparatus 100. The controller 110 includes a central processing unit (CPU) 110a, a random access memory (RAM) 110b, and a read only memory (ROM) 110c.

The CPU 110a implements the functions of the image processing apparatus 100 by loading various programs stored in the ROM 110c or the like into the RAM 110b.

The RAM 110b is used as a work memory or the like for the CPU 110a.

The ROM 110c stores the various programs run by the CPU 110a.

The HDD 120 is a memory for storing various pieces of data. The HDD 120 stores image data generated through image reading performed by the image reading unit 140, image data having undergone image processing performed by the image processing unit 170, and the like.

The operation panel 130 displays various pieces of information and receives input operations performed by a user. Examples of the operation panel 130 include a touch panel display.

The image reading unit 140 reads an image recorded on a recording material such as paper and generates data (image data) regarding the read image. The image reading unit 140 is, for example, a scanner. A charge coupled device (CCD) scanner and a contact image sensor (CIS) scanner may be used. The CCD scanner receives light in such a manner that the light is radiated from a light source, reflected on a document, and reduced by a lens. The CIS scanner receives light in such a manner that light beams are serially radiated from a light emitting diode (LED) light source and reflected on a document.

The image forming unit 150 is a printing mechanism that forms an image on a recording material such as paper. The image forming unit 150 is, for example, a printer. An electrophotographic printer and an inkjet printer may be used. The electrophotographic printer forms an image in such a manner that toner caused to attach to a photoconductor is transferred onto a recording material. The inkjet printer forms an image in such a manner that ink is discharged onto a recording material.

The communication I/F 160 is a communication interface that transmits and receives various pieces of data to and from another apparatus through a network.

After reading an image and generating image data, the image reading unit 140 inputs the image data into the image processing unit 170 or the like. The communication I/F 160 receives image data from an external apparatus through the network and inputs the received image data into the image processing unit 170 or the like. The image reading unit 140 and the communication I/F 160 may thus be regarded as an image input unit 10.

The image forming unit 150 forms and outputs an image onto a recording medium such as paper. Further, the communication I/F 160 outputs image data to an external apparatus through the network. The image forming unit 150 and the communication I/F 160 may thus be regarded as an image output unit 20.

The image processing unit 170 performs various image processing operations on the image data input from the image input unit 10. The image processing unit 170 includes multiple image processing modules 171 having functions of the various image processing operations executed on the image data such as shading correction and modulation transfer function (MTF) correction. Under the control of the controller 110, one or more grouped image processing modules 171 of the multiple image processing modules 171 are selected and perform image processing operations. This will be described in detail later.

The shading correction is a correction process for reducing color value (for example, a RGB value) variations in pixels. The MTF correction is a correction process for correcting deteriorated optical frequency characteristics by using a two-dimensional spatial filter. In the exemplary embodiment, the multiple image processing modules 171 are each used as an example of multiple image processing units that respectively perform different types of image processing operations executable on image data.

Functional Configuration of Controller and Image Processing Unit

Figure 2:
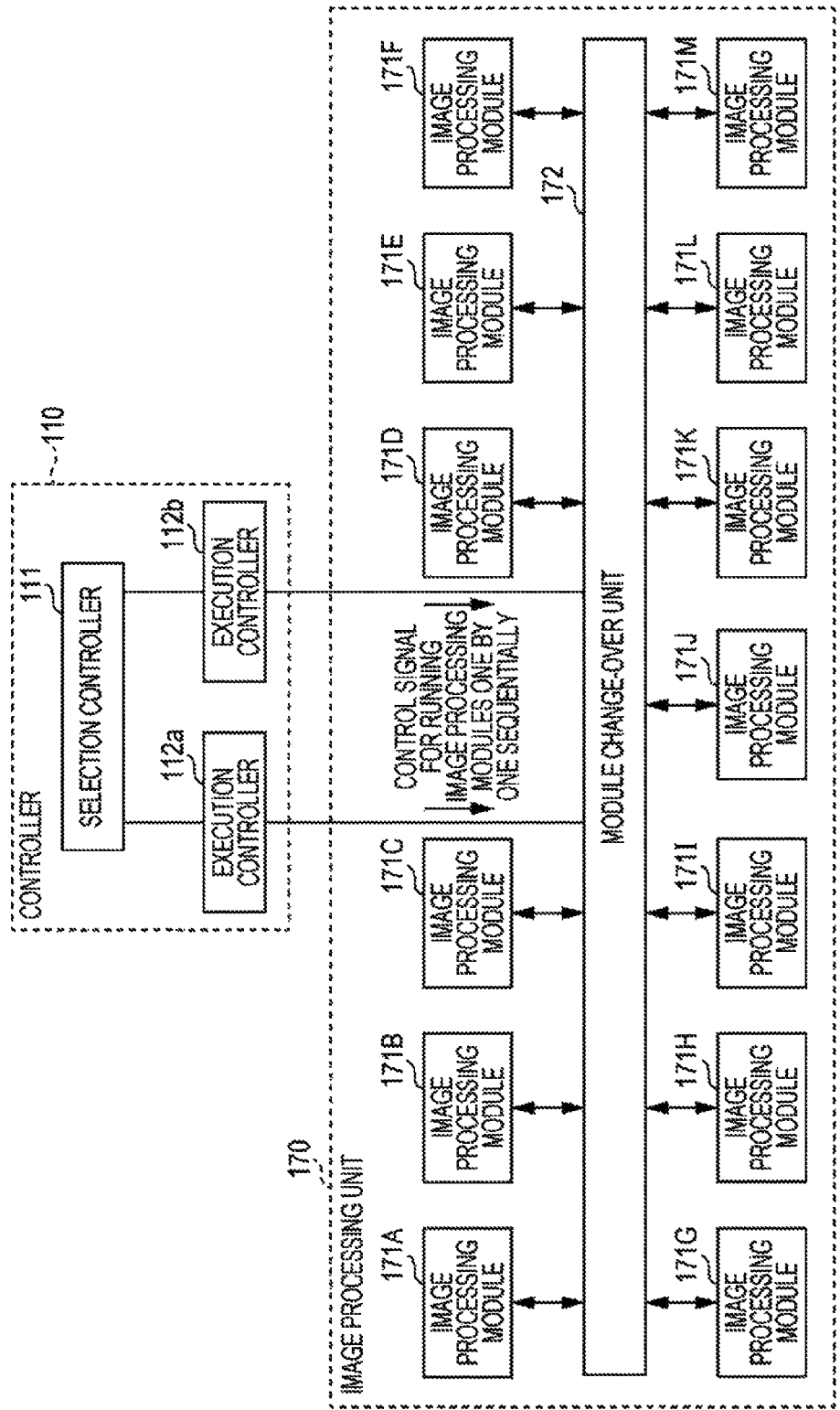
FIG. 2 is a block diagram illustrating an example functional configuration of a controller and an image processing unit.

The functional configuration of the controller 110 and the image processing unit 170 will be described in detail. FIG. 2 is a block diagram illustrating an example functional configuration of the controller 110 and the image processing unit 170.

The image processing unit 170 includes the multiple image processing modules 171 (image processing modules 171A to 171M in the example illustrated in FIG. 2) and a module change-over unit 172. Although the thirteen image processing modules 171 that are the image processing modules 171A to 171M are illustrated in the example in FIG. 2, the number of the image processing modules 171 of the image processing unit 170 is not limited to 13 in FIG. 2.

The image processing modules 171A to 171M have image processing functions executable by the image processing modules 171A to 171M, such as the shading correction and the MTF correction described above. The image processing modules 171A to 171M may respectively have different image processing functions, or some of the image processing modules 171A to 171M may have the same image processing function.

The module change-over unit 172 receives, from the controller 110, a control signal for running image processing modules 171 one by one sequentially. The module change-over unit 172 changes the image processing modules 171 in accordance with the received control signal.

The controller 110 includes, as function units that control operations of the image processing unit 170, a selection controller 111 and multiple execution controllers 112 (execution controllers 112a and 112b in the example illustrated in FIG. 2). Although two execution controllers 112 that are the execution controllers 112a and 112b are illustrated in the example in FIG. 2, the number of the execution controllers 112 of the controller 110 is not limited to two in FIG. 2. In the exemplary embodiment, the selection controller 111 is used as an example of a selection unit. The multiple execution controllers 112 are each used as an example of multiple execution controllers that each perform control to select and run grouped image processing units.

In a series of image processing operations performed by the image processing unit 170 on input image data, the selection controller 111 selects one of the execution controllers 112 in accordance with a predetermined rule.

More specifically, a setting operation for enabling one of the execution controllers 112 is performed in advance on a settings file to be read, for example, when the image processing apparatus 100 is switched on. If a setting operation for enabling the execution controller 112a has been performed on the settings file, the selection controller 111 selects the execution controller 112a from the execution controllers 112 on the basis of the settings file. In contrast, if a setting operation for enabling the execution controller 112b has been performed on the settings file, the selection controller 111 selects the execution controller 112b from the execution controllers 112 on the basis of the settings file. Circuit information stored, for example, in a semiconductor memory is usable for the settings file.

The configuration in the exemplary embodiment is not limited to the configuration in which the selection controller 111 selects one of the execution controllers 112 in accordance with the setting information recorded in the settings file.

For example, the selection controller 111 may select one of the execution controllers 112 in accordance with procedures for switching on the component units of the image processing apparatus 100 to start up the component units. In this case, for example, procedures specifying the order in which the component units of the image processing apparatus 100 are started up to enable the execution controller 112 are specified in advance on a per execution controller 112 basis. When the image processing apparatus 100 is switched on, the selection controller 111 checks the order in which the component units are to be started up and judges which one of the execution controllers 112 is to be enabled. Based on the judgment result, selection controller 111 selects one of the execution controllers 112. As described above, the selection controller 111 may select one of the execution controllers 112 on the basis of the procedures specified for the operations of the image processing apparatus 100.

Further, the selection controller 111 may select one of the execution controllers 112 on the basis of a setting operation performed by a user of the image processing apparatus 100. In this case, for example, permission information for enabling the execution controllers 112 and passwords for enabling the execution controllers 112 are set in advance for the respective execution controllers 112. Upon receiving, from the user, permission information or a password for enabling one of the execution controllers 112, the selection controller 111 judges which one of the execution controllers 112 is to be enabled on the basis of the setting. Based on the judgment result, the selection controller 111 selects one of the execution controllers 112.

As described above in the exemplary embodiment, it may be understood that different processes are respectively performed to enable the execution controllers 112. If a specific user uses the image processing apparatus 100, one of the execution controllers 112 is selected to perform the corresponding image processing operation, and the other one of the execution controllers 112 that is not selected is hidden from the user.

The execution controllers 112 control the image processing operations performed by the image processing unit 170. More specifically, upon being selected by the selection controller 111, one of the execution controllers 112 selects one or more grouped image processing modules 171 of the multiple image processing modules 171. The execution controller 112 outputs, to the module change-over unit 172, a control signal for running the selected image processing modules 171 one by one sequentially and causes the running image processing module 171 to perform the corresponding image processing operation.

Different rules for selecting one or more modules (hereinafter, referred to as module selection rules) are specified in advance for the respective execution controllers 112. When being selected by the selection controller 111, one of the execution controllers 112 selects grouped image processing modules 171 of the multiple image processing modules 171 in accordance with the corresponding module selection rule specified for the execution controller 112.

For example, if the selection controller 111 selects the execution controller 112a, the execution controller 112a selects grouped image processing modules 171 of the multiple image processing modules 171 in accordance with the module selection rule for the execution controller 112a. The execution controller 112a runs the selected image processing modules 171 in order in accordance with the module selection rule. For example, if the selection controller 111 selects the execution controller 112b, the execution controller 112b selects grouped image processing modules 171 of the multiple image processing modules 171 in accordance with the module selection rule for the execution controller 112b. The execution controller 112b runs the selected image processing modules 171 in order in accordance with the module selection rule.

The module selection rule for the execution controller 112 is, for example, based on an address map. Each execution controller 112 has the corresponding address map in which, for example, unique addresses of the physical locations of the respective image processing modules 171 are specified. Further, the addresses of the image processing modules 171 are used to specify which of the image processing modules 171 are to be used and the order in which the image processing modules 171 are to be used.

Note that it is conceivable that the grouped image processing modules 171 selected by the execution controller 112 include image processing modules 171 allowed to perform image processing operations in parallel. In such a case, the execution controller 112 may run the two or more image processing modules 171 in parallel. The execution controller 112 does not have to run the image processing modules 171 one by one sequentially.

In the exemplary embodiment, one of the execution controllers 112 is selected in this manner. The selected execution controller 112 selects grouped image processing modules 171, and the image processing modules 171 perform the respective image processing operations.

Consider a case where, for example, user A and user B use image processing apparatuses 100. User A uses one of the image processing apparatuses 100 that is set to enable processing a for enabling the execution controller 112a and not to enable processing b for enabling the execution controller 112b. User B uses a different one of the image processing apparatuses 100 that is set to enable the processing b and not to enable the processing a.

In this case, user A is allowed to enable the execution controller 112a to cause the image processing modules 171 selected by the execution controller 112a to perform the corresponding image processing operations but is not allowed to enable the execution controller 112b. In contrast, user B is allowed to enable the execution controller 112b to cause the image processing modules 171 selected by the execution controller 112b to perform the corresponding image processing operations but is not allowed to enable the execution controller 112a. In addition, if program codes describing processing operations of the execution controllers 112, the address maps, and the like are encrypted, neither user A nor user B knows which image processing operation is being performed by the other.

In a further description, for example, if the image processing apparatuses 100 are provided to multiple companies, the details of the image processing operations of the respective image processing modules 171 are disclosed to the companies. However, in some cases, a company wishes to use, as their own information, information regarding how the image processing modules 171 are grouped and run and wishes to avoid disclosing the information to the other companies. In such cases, for example, the company uses information regarding dedicated settings for the company, operation procedures for the image processing apparatus 100 that are provided specially for the company, a password disclosed only to the company, and the like, and one of the execution controllers 112 that is not disclosed to the other companies is thereby enabled. The use of the execution controller 112 prevents disclosure, to the other companies, of their own information regarding how the image processing modules 171 are grouped and run.

Specific Example Operations of Image Processing Unit

Figure 3:
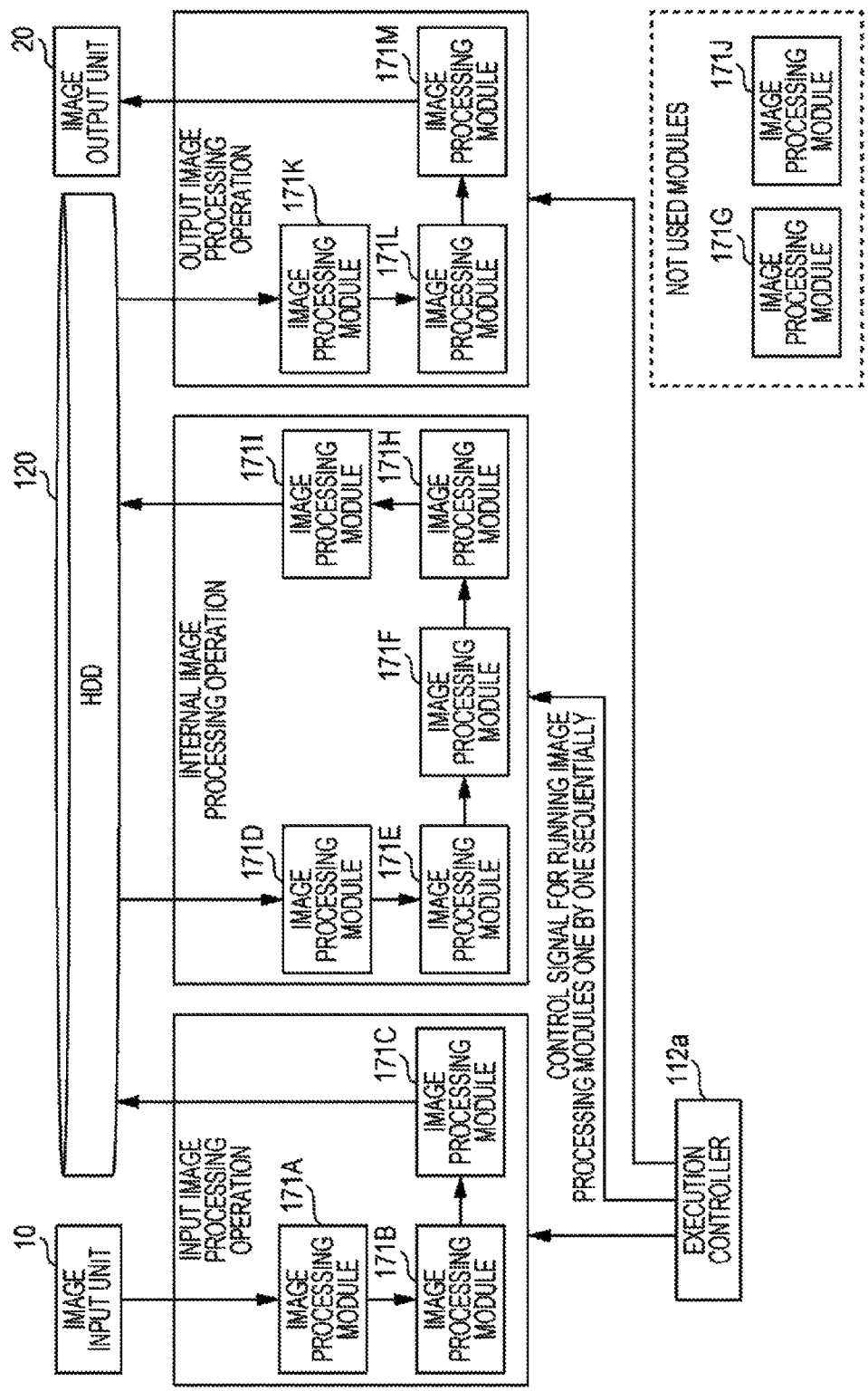
FIG. 3 is a diagram illustrating a specific example operation of the image processing unit controlled by the controller.
Figure 4:
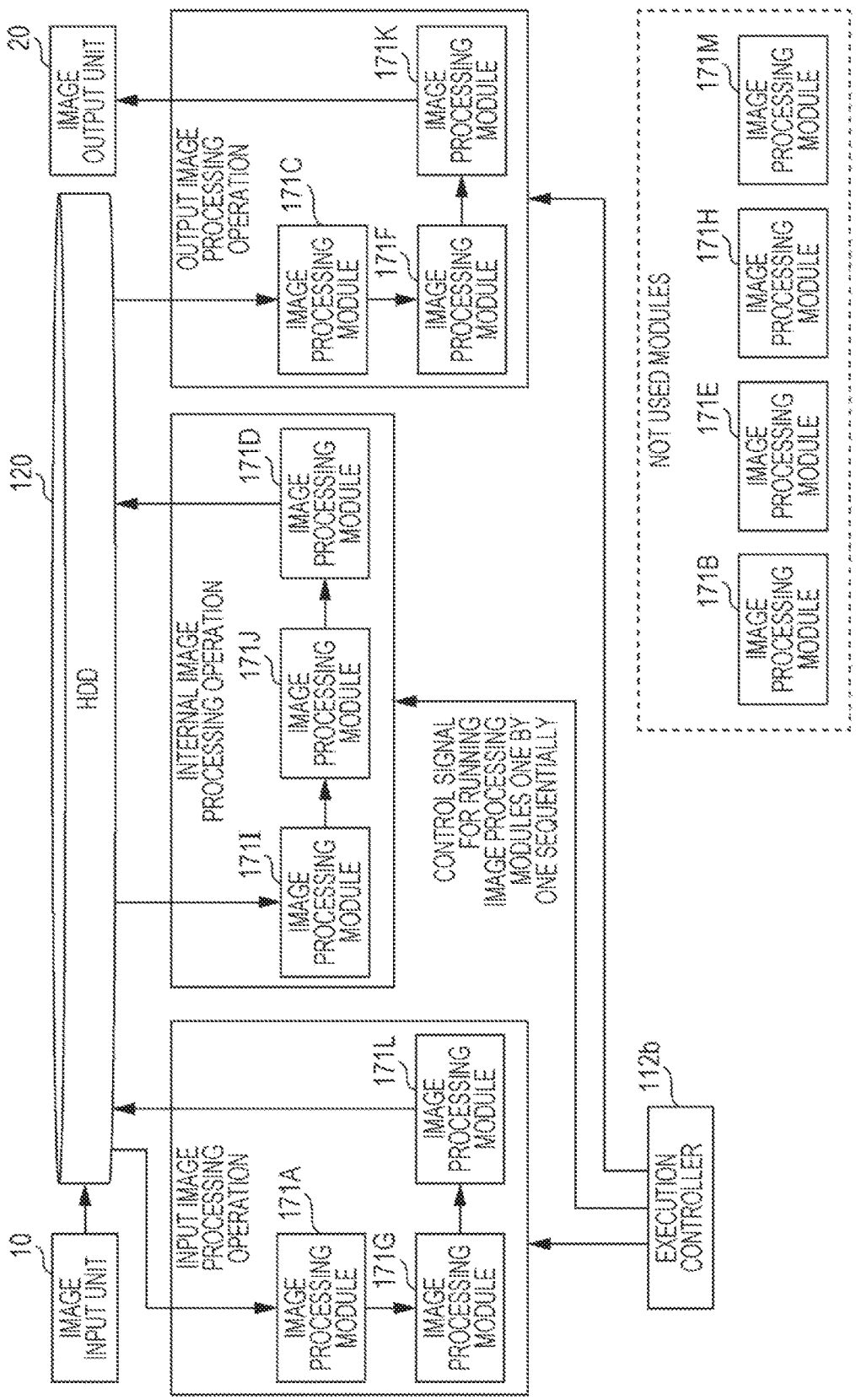
FIG. 4 is a diagram illustrating a specific example operation of the image processing unit controlled by the controller.

Operations of the image processing unit 170 controlled by the controller 110 will be described by taking specific examples. FIGS. 3 and 4 are diagrams respectively illustrating specific example operations of the image processing unit 170 controlled by the controller 110. The example in FIG. 3 illustrates a case where the execution controller 112a is enabled. The example in FIG. 4 illustrates a case where the execution controller 112b is enabled.

First, the example illustrated in FIG. 3 will be described.

The module selection rule for the execution controller 112a specifies that the image processing modules 171G and 171J of the image processing modules 171A to 171M are not to be used, the other image processing modules 171 are to be used, and which image processing module 171 is to be used for one of three processing operations that are an input image processing operation, an internal image processing operation, and an output image processing operation. Note that the input image processing operation is performed on the image data input from the image input unit 10. The output image processing operation is performed before image data is output to the image forming unit 150. The internal image processing operation is performed between the input image processing operation and the output image processing operation.

More specifically, in the input image processing operation, the image processing modules 171A, 171B, and 171C perform the respective image processing operations in order on the image data input from the image input unit 10. The image data having undergone the image processing operation performed by the image processing module 171C is stored in the HDD 120. In the internal image processing operation, the image processing modules 171D, 171E, 171F, 171H, and 171I perform the image processing operations in order on the image data having undergone the image processing operation performed by the image processing module 171C. The image data having undergone the image processing operation performed by the image processing module 171I is stored in the HDD 120. In the output image processing operation, the image processing modules 171K, 171L, and 171M perform the image processing operations in order on the image data having undergone the image processing operation performed by the image processing module 171I. After the image processing module 171M performs the image processing operation, the image data is output to the image output unit 20. Thereafter, the image forming unit 150 forms an image on a recording material, and the communication I/F 160 transmits the image data to an external apparatus, and other operations are performed.

As described above, the module selection rule for the execution controller 112a specifies that, in each of the input image processing operation, the internal image processing operation, and the output image processing operation, which of the image processing modules 171 are to be used and the order in which the image processing modules 171 are to be used.

The example illustrated in FIG. 4 will be described.

The module selection rule for the execution controller 112b specifies that the image processing modules 171B, 171E, 171H, and 171M of the image processing modules 171A to 171M are not to be used and, the other image processing modules 171 are to be used.

More specifically, in the input image processing operation, the image processing modules 171A, 171G, and 171L perform the respective image processing operations in order on image data input from the image input unit 10 and stored in the HDD 120. The image data having undergone the image processing operation performed by the image processing module 171L is stored in the HDD 120. In the internal image processing operation, the image processing modules 171I, 171J, and 171D perform the respective image processing operations in order on the image data having undergone the image processing operation performed by the image processing module 171L. The image data having undergone the image processing operation performed by the image processing module 171D is stored in the HDD 120. Further, in the output image processing operation, the image processing modules 171C, 171F, and 171K perform the respective image processing operations in order on the image data having undergone the image processing operation performed by the image processing module 171D. After the image processing module 171K performs the image processing operation, the image data is output to the image output unit 20. Thereafter, the image forming unit 150 forms an image on a recording material, the communication I/F 160 transmits the image data to the external apparatus, and other operations are performed.

As described above, the module selection rule for the execution controller 112b specifies that, in each of the input image processing operation, the internal image processing operation, and the output image processing operation, which of the image processing modules 171 are to be used and the order in which the image processing modules 171 are to be used.

In the examples illustrated in FIGS. 3 and 4, the execution controller 112a uses the image processing module 171M but does not use the image processing module 171J, while the execution controller 112b uses the image processing module 171J but does not use the image processing module 171M.

As described above, each execution controller 112 uses the image processing modules 171 different from those used by the other execution controller 112. The used image processing modules 171 are set for each execution controller 112.

Further, in the examples illustrated in FIGS. 3 and 4, the execution controller 112a uses the image processing module 171C in the input image processing operation, while the execution controller 112b uses the image processing module 171C in the output image processing operation. That is, under the control of the execution controller 112a, the image processing module 171C processes the image data input, for example, through image reading performed by the image reading unit 140. In contrast, under the control of the execution controller 112b, the image processing module 171C performs the image processing operation prior to, for example, image forming by the image forming unit 150. As described above, the processing stage in which an image processing module 171 is to be used in the series of image processing operations is set for each execution controller 112. It is conceivable that as the result of the setting operation, the processing stage in which a specific image processing module 171 is used varies depending on the execution controller 112.

In the examples illustrated in FIGS. 3 and 4, each image processing module 171 is used for a corresponding one of the input image processing operation, the internal image processing operation, and the output image processing operation, but the configuration is not limited to this configuration. That is, one of the image processing modules 171 may be used multiple times in the series of image processing operations performed by the image processing unit 170. For example, under the control of the execution controller 112a, the image processing module 171A may be used multiple times in the input image processing operation, or the image processing module 171A may also be used in both the input image processing operation and the internal image processing operation.

Specific Examples of Image Processing Modules

Figure 5:
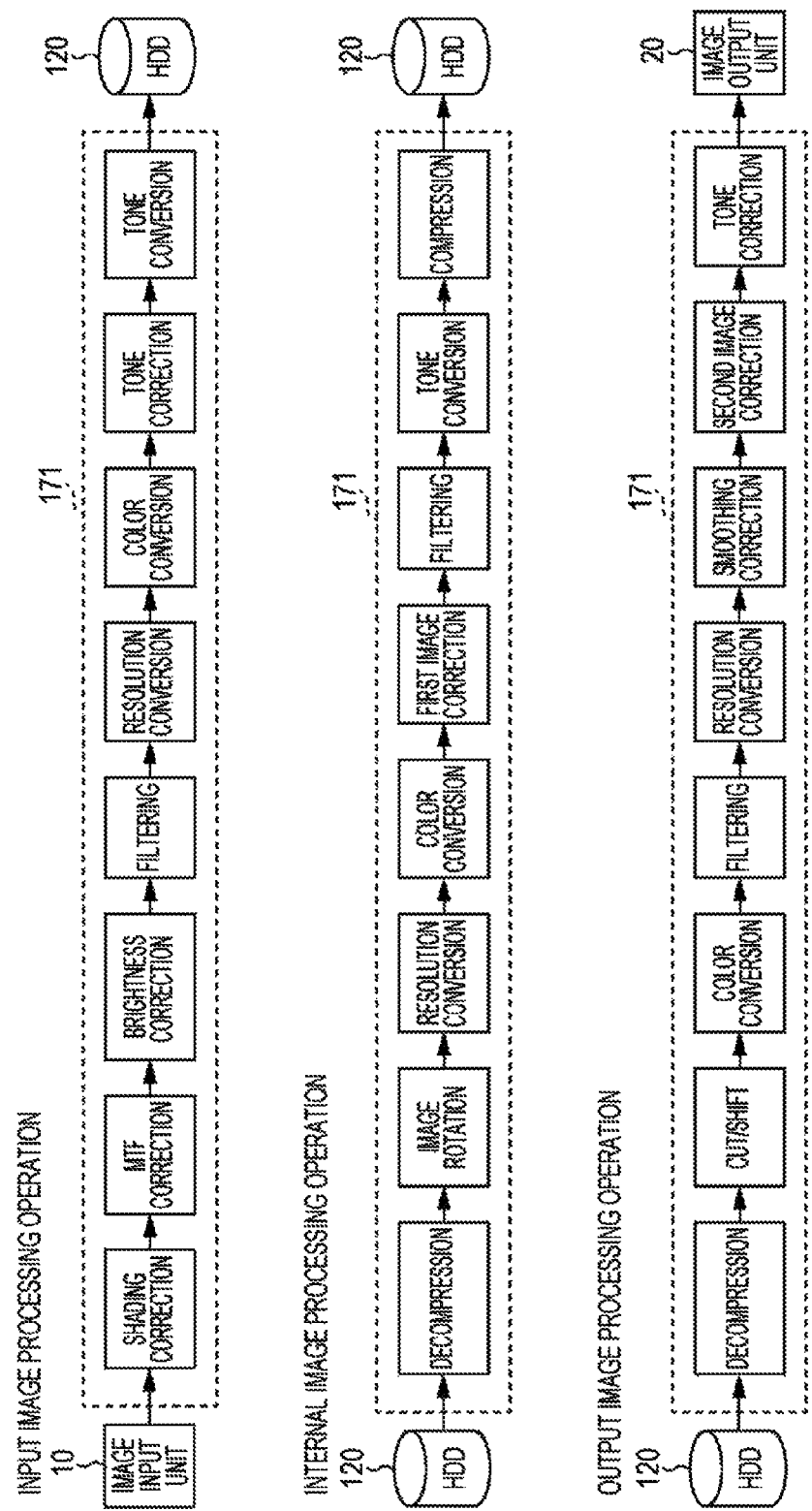
FIG. 5 is a diagram for explaining specific example functions of image processing modules.

Specific examples of the functions of the image processing modules 171 will be described. FIG. 5 is a diagram for explaining specific example functions of the image processing modules 171. In the description, the selection controller 111 selects one of the execution controllers 112, and the execution controller 112 selects grouped image processing modules 171.

First, in the input image processing operation, eight image processing modules 171 respectively having functions that are shading correction, MTF correction, brightness correction, filtering, resolution conversion, color conversion, tone correction, and tone conversion perform processing operations in order. In the brightness correction, the brightness of the image data is corrected. In the filtering, pieces of data are filtered to extract a specific piece of data. In the resolution conversion, the resolution of the image data is converted. In the color conversion, for example, the color values of the image data are converted into values in a different color space. In the tone correction and the tone conversion, a tone of the image data is corrected and converted, respectively.

Next in the internal image processing operation, eight image processing modules 171 respectively having functions that are decompression, image rotation, resolution conversion, color conversion, first image correction, filtering, tone conversion, and compression perform processing operations in order. In the decompression, compressed coded data in a compression coding format is processed in accordance with a compression algorithm, and the pixel values of the image data are thereby restored. In the image rotation, an image based on the image data is rotated in steps of 90 degrees to be oriented in the same orientation as paper or rotated by a small angle to correct the orientation of the image. In the first image correction, for example, the contrast, tint, or hue of the image data is corrected. In the compression, the file size is reduced when the image data is saved or transmitted. The file size is reduced in accordance with an image compression algorithm such as the joint photographic experts group (JPEG) method or the joint bi-level image experts group (JBIG) method.

Next in the output image processing operation, eight image processing modules 171 respectively having the functions that are decompression, cut/shift, color conversion, filtering, resolution conversion, smoothing correction, second image correction, and tone correction perform processing operations in order. In the cut/shift, a specific piece of data is extracted. In the smoothing correction, darkness variations in the image data are reduced. The second image correction is a correction process such as tone correction executed on the image data.

As described above, the multiple image processing modules 171 have the various image processing functions.

In the example illustrated in FIG. 5, for example, the image processing module 171 having the filtering function is used in each of the input image processing operation, the internal image processing operation, and the output image processing operation. For example, the image processing module 171 having the decompression function is used in the internal image processing operation and the output image processing operation. For example, the image processing module 171 having the shading correction function is used only in the input image processing operation.

Note that in the example illustrated in FIG. 5, for example, the image processing module 171 having the resolution conversion function and used in the input image processing operation may serve as the image processing module 171 having the resolution conversion function and used in the output image processing operation. However, another image processing module 171 having the resolution conversion function may be provided as the image processing module 171 used in the output image processing operation separately.

Note that programs for implementing the exemplary embodiment of the invention may be provided not only through a communication medium but also in such a manner as to be stored in a recording medium such as a compact disc (CD)-ROM.

The exemplary embodiment of the present invention has heretofore been described; however, the technical scope of the present invention is not limited to the scope of the exemplary embodiment described above. From the description of the scope of claims, it is apparent that the technical scope of the invention includes various modifications and improvements made to the exemplary embodiment.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a controller including a processor and a memory, the memory storing instructions that cause the processor to function as:
an image processing unit comprising a plurality of image processing modules, that respectively perform different types of image processing operations executable on image data; and
a plurality of execution controllers that each perform control to select and run grouped image processing modules of the plurality of image processing modules,
wherein each of the plurality of execution controllers includes a plurality of rules, each rule defines which image processing modules are to be used for a particular task, selects and runs the grouped image processing modules in accordance with a corresponding one of the rules that are specified for the respective execution controllers, and one of the plurality of execution controllers is used in a series of image processing operations performed on the image data.

2. The image processing apparatus according to claim 1, wherein each of the plurality of execution controllers runs the selected grouped image processing modules in order in accordance with the corresponding one of the rules specified for the respective execution controllers.

3. The image processing apparatus according to claim 2, wherein different processes are respectively performed to enable the plurality of execution controllers,
the image processing apparatus further comprising:
a selection unit that selects one of the plurality of execution controllers that is enabled.

4. The image processing apparatus according to claim 3, wherein the plurality of image processing modules include an image processing module that is run by one of the plurality of execution controllers in a first processing stage in the series of image processing operations and that is run by a different one of the plurality of execution controllers in a second processing stage in the series of image processing operations.

5. The image processing apparatus according to claim 2, wherein the plurality of image processing modules include an image processing module that is run by one of the plurality of execution controllers in a first processing stage in the series of image processing operations and that is run by a different one of the plurality of execution controllers in a second processing stage in the series of image processing operations.

6. The image processing apparatus according to claim 1, wherein different processes are respectively performed to enable the plurality of execution controllers,
the image processing apparatus further comprising:
a selection unit that selects one of the plurality of execution controllers that is enabled.

7. The image processing apparatus according to claim 6, wherein the plurality of image processing modules include an image processing module that is run by one of the plurality of execution controllers in a first processing stage in the series of image processing operations and that is run by a different one of the plurality of execution controllers in a second processing stage in the series of image processing operations.

8. The image processing apparatus according to claim 1, wherein the plurality of image processing modules include an image processing modules that is run by one of the plurality of execution controllers in a first processing stage in the series of image processing operations and that is run by a different one of the plurality of execution controllers in a second processing stage in the series of image processing operations.

9. The image processing apparatus according to claim 1, wherein the image processing unit further comprises a module changeover unit, wherein the module changeover unit runs image processing modules sequentially based on signals received from the execution controllers.

10. An image processing apparatus comprising:
a controller including a processor and a memory, the memory storing instructions that cause the processor to function as:
an image processing unit comprising a plurality of image processing modules that respectively perform different types of image processing operations executable on image data;
a plurality of execution controllers that each perform control to select and run grouped image processing modules of the plurality of image processing modules controllers, wherein each execution controller includes a plurality of rules and each rule defines which image processing modules are to be used for a particular task; and
a hiding unit that, when a specific user uses the image processing apparatus, causes one of the plurality of execution controllers to select and run the grouped image processing modules and hides the other one or more execution controllers from the specific user.

11. An image forming apparatus comprising:
a controller including a processor and a memory, the memory storing instructions that cause the processor to function as:
an image processing unit comprising a plurality of image processing modules that respectively perform different types of image processing operations executable on image data; and
a plurality of execution controllers that each perform control to select and run grouped image processing modules of the plurality of image processing modules, each execution controller includes a plurality of rules and each rule defines which image processing modules are to be used for a particular task; and
an image forming unit that forms an image on a recording material in accordance with the image data having undergone the image processing operations respectively performed by the selected grouped image processing modules,
wherein each of the plurality of execution controllers selects and runs the grouped image processing modules in accordance with a corresponding one of rules that are specified for the respective execution controllers, and one of the plurality of execution controllers is used in a series of image processing operations performed on the image data.

* * * * *